(12) United States Patent
Heisey

(10) Patent No.: US 10,690,936 B2
(45) Date of Patent: Jun. 23, 2020

(54) ADJUSTABLE NOSE BRIDGE ASSEMBLY FOR HEADWORN COMPUTER

(71) Applicant: Mentor Acquisition One, LLC, Plantation, FL (US)

(72) Inventor: Andrew Carl Heisey, Walnut Creek, CA (US)

(73) Assignee: Mentor Acquisition One, LLC, Plantation, FL (US)

( * ) Notice: Subject to any disclaimer, the term of this patent is extended or adjusted under 35 U.S.C. 154(b) by 13 days.

(21) Appl. No.: 15/249,637

(22) Filed: Aug. 29, 2016

(65) Prior Publication Data
US 2018/0059434 A1    Mar. 1, 2018

(51) Int. Cl.
*G02C 5/12* (2006.01)
*G06F 1/16* (2006.01)
*G02B 27/01* (2006.01)
*G02C 11/00* (2006.01)

(52) U.S. Cl.
CPC .......... *G02C 5/124* (2013.01); *G02B 27/0172* (2013.01); *G02B 27/0176* (2013.01); *G06F 1/163* (2013.01); *G02B 2027/014* (2013.01); *G02B 2027/0178* (2013.01); *G02C 11/10* (2013.01)

(58) Field of Classification Search
CPC .......... G02C 5/12; G02C 5/122; G02C 5/124; G02C 5/126; G02C 5/04; G02B 2027/0178; G02B 27/01; G02B 27/017; G02B 27/0176
USPC ........................................ 351/136, 137, 138
See application file for complete search history.

(56) References Cited

U.S. PATENT DOCUMENTS

| 1,897,833 | A | 2/1933 | Benway |
| 2,064,604 | A | 12/1936 | Hempel |
| 3,531,190 | A | 9/1970 | Leblanc |
| 3,671,111 | A | 6/1972 | Okner |
| 4,145,125 | A | 3/1979 | Chika |

(Continued)

FOREIGN PATENT DOCUMENTS

| EP | 368898 A1 | 5/1990 |
| EP | 777867 A1 | 6/1997 |

(Continued)

OTHER PUBLICATIONS

US 8,743,465 B2, 06/2014, Totani et al. (withdrawn)

(Continued)

*Primary Examiner* — Cara E Rakowski
(74) *Attorney, Agent, or Firm* — Morrison & Foerster LLP

(57) ABSTRACT

Aspects of the present invention relate to a head-worn computer, comprising a removable and replacable adjustable nose bridge assembly, wherein the adjustable nose bridge assembly has at least three user adjustable features to adapt the adjustable nose bridge assembly to the user's nose, wherein a first adjustment of the at least three user adjustable features is adapted to move the adjustable nose bridge up and down relative a lens of the head-worn computer, wherein a second adjustment of the at least three user adjustable features is adapted to rotate a nose pad of the adjustable nose bridge about an axis substantially perpendicular to a top frame of the head-worn computer, and wherein a third adjustment of the at least three user adjustable features is adapted to flare the nose pad to the side of the axis.

9 Claims, 12 Drawing Sheets

(56) References Cited

U.S. PATENT DOCUMENTS

| | | | |
|---|---|---|---|
| 4,513,812 A | 4/1985 | Papst et al. | |
| 4,695,129 A | 9/1987 | Faessen et al. | |
| 5,596,451 A | 1/1997 | Handschy et al. | |
| 5,625,372 A | 4/1997 | Hildebrand et al. | |
| D383,148 S | 9/1997 | Lee | |
| 5,717,422 A | 2/1998 | Fergason et al. | |
| 5,808,800 A | 9/1998 | Handschy et al. | |
| 5,808,802 A | 9/1998 | Hur | |
| 5,870,166 A | 2/1999 | Chang | |
| 5,954,642 A | 9/1999 | Johnson et al. | |
| 5,971,538 A * | 10/1999 | Heffner | G02C 5/122 345/8 |
| 6,034,653 A | 3/2000 | Robertson et al. | |
| 6,076,927 A | 6/2000 | Owens | |
| 6,137,675 A | 10/2000 | Perkins | |
| 6,157,291 A * | 12/2000 | Kuenster | G02B 27/0172 345/8 |
| 6,195,136 B1 | 2/2001 | Handschy et al. | |
| 6,359,723 B1 | 3/2002 | Handschy et al. | |
| 6,369,952 B1 | 4/2002 | Rallison et al. | |
| 6,421,031 B1 | 7/2002 | Ronzani et al. | |
| 6,456,438 B1 | 9/2002 | Lee et al. | |
| 6,480,174 B1 * | 11/2002 | Kaufmann | G02B 27/0172 345/7 |
| 6,491,389 B2 | 12/2002 | Yaguchi et al. | |
| 6,824,265 B1 | 11/2004 | Harper | |
| 6,847,336 B1 | 1/2005 | Lemelson et al. | |
| 6,987,787 B1 | 1/2006 | Mick | |
| D521,493 S | 5/2006 | Wai | |
| 7,088,234 B2 | 8/2006 | Naito et al. | |
| 7,199,934 B2 | 4/2007 | Yamasaki | |
| 7,206,134 B2 | 4/2007 | Weissman et al. | |
| 7,425,065 B2 * | 9/2008 | Wang | G02C 5/122 351/137 |
| 7,477,207 B2 | 1/2009 | Estep | |
| 7,582,828 B2 | 9/2009 | Ryan | |
| 7,791,889 B2 | 9/2010 | Belady et al. | |
| 7,830,370 B2 | 11/2010 | Yamazaki et al. | |
| D628,616 S | 12/2010 | Yuan | |
| 7,850,301 B2 | 12/2010 | DiChiara et al. | |
| 7,855,743 B2 | 12/2010 | Sako et al. | |
| 7,928,926 B2 | 4/2011 | Yamamoto et al. | |
| 8,004,765 B2 | 8/2011 | Amitai | |
| D645,492 S | 9/2011 | Zhao | |
| D645,493 S | 9/2011 | Zhao | |
| 8,018,579 B1 | 9/2011 | Krah et al. | |
| D646,316 S | 10/2011 | Zhao | |
| D647,947 S | 11/2011 | Yu | |
| 8,089,568 B1 | 1/2012 | Brown et al. | |
| 8,092,007 B2 | 1/2012 | DiChiara et al. | |
| 8,166,421 B2 | 4/2012 | Magal et al. | |
| D665,838 S | 8/2012 | Kim et al. | |
| D667,482 S | 9/2012 | Healy et al. | |
| D667,483 S | 9/2012 | Krsmanovic | |
| D669,066 S | 10/2012 | Olsson et al. | |
| D671,590 S | 11/2012 | Klinar et al. | |
| 8,378,924 B2 | 2/2013 | Jacobsen et al. | |
| D680,152 S | 4/2013 | Olsson et al. | |
| 8,427,396 B1 | 4/2013 | Kim | |
| D685,019 S | 6/2013 | Li | |
| 8,494,215 B2 | 7/2013 | Kimchi et al. | |
| D692,047 S | 10/2013 | Shin | |
| 8,553,910 B1 | 10/2013 | Dong et al. | |
| 8,564,883 B2 | 10/2013 | Totani et al. | |
| D693,398 S | 11/2013 | Rubin | |
| 8,576,276 B2 | 11/2013 | Bar-Zeev et al. | |
| 8,576,491 B2 | 11/2013 | Takagi et al. | |
| 8,587,869 B2 | 11/2013 | Totani et al. | |
| 8,593,795 B1 | 11/2013 | Chi et al. | |
| 8,594,467 B2 | 11/2013 | Lu et al. | |
| 8,662,686 B2 | 3/2014 | Takagi et al. | |
| 8,665,214 B2 | 3/2014 | Forutanpour et al. | |
| 8,670,183 B2 | 3/2014 | Clavin et al. | |
| 8,678,581 B2 | 3/2014 | Blum et al. | |
| 8,698,157 B2 | 4/2014 | Hanamura | |
| 8,711,487 B2 | 4/2014 | Takeda et al. | |
| D704,764 S | 5/2014 | Markovitz et al. | |
| 8,745,058 B1 | 6/2014 | Garcia-Barrio | |
| 8,750,541 B1 | 6/2014 | Dong et al. | |
| 8,752,963 B2 | 6/2014 | McCulloch et al. | |
| 8,803,867 B2 | 8/2014 | Oikawa | |
| 8,814,691 B2 | 8/2014 | Osterhout et al. | |
| 8,823,071 B2 | 9/2014 | Oyamada | |
| 8,832,557 B2 | 9/2014 | Tang et al. | |
| 8,837,880 B2 | 9/2014 | Takeda et al. | |
| 8,866,702 B1 | 10/2014 | Mirov et al. | |
| D716,808 S | 11/2014 | Yeom et al. | |
| 8,878,749 B1 | 11/2014 | Wu et al. | |
| D719,568 S | 12/2014 | Heinrich et al. | |
| D719,569 S | 12/2014 | Heinrich et al. | |
| D719,570 S | 12/2014 | Heinrich et al. | |
| D723,092 S | 2/2015 | Markovitz et al. | |
| 8,955,973 B2 | 2/2015 | Raffle et al. | |
| 8,957,835 B2 | 2/2015 | Hoellwarth | |
| 8,964,298 B2 | 2/2015 | Haddick et al. | |
| 9,143,693 B1 | 9/2015 | Zhou et al. | |
| D741,398 S | 10/2015 | Echeverri | |
| 9,158,116 B1 * | 10/2015 | Osterhout | G02B 27/0176 |
| D744,581 S | 12/2015 | Votel et al. | |
| D745,007 S | 12/2015 | Cazalet et al. | |
| D747,401 S | 1/2016 | Exley | |
| D751,551 S | 3/2016 | Ho et al. | |
| D751,552 S | 3/2016 | Osterhout | |
| D757,006 S | 5/2016 | Cazalet et al. | |
| D761,796 S | 7/2016 | Heinrich | |
| D765,076 S | 8/2016 | Rochat et al. | |
| 9,423,842 B2 * | 8/2016 | Osterhout | G06F 1/206 |
| D766,895 S | 9/2016 | Choi | |
| D768,759 S | 10/2016 | Markovitz et al. | |
| D769,873 S | 10/2016 | Cazalet et al. | |
| 9,482,880 B1 | 11/2016 | Chandrasekhar et al. | |
| 9,523,856 B2 | 12/2016 | Osterhout et al. | |
| 9,529,195 B2 | 12/2016 | Osterhout et al. | |
| 9,529,199 B2 | 12/2016 | Osterhout et al. | |
| 9,651,787 B2 * | 5/2017 | Haddick | G02B 27/0176 |
| 9,651,788 B2 | 5/2017 | Osterhout et al. | |
| 9,651,789 B2 | 5/2017 | Osterhout et al. | |
| 9,672,210 B2 * | 6/2017 | Osterhout | G02B 27/017 |
| 9,684,172 B2 | 6/2017 | Border et al. | |
| D792,400 S | 7/2017 | Osterhout | |
| D793,391 S | 8/2017 | Nakagawa et al. | |
| D793,467 S | 8/2017 | Krause | |
| D794,022 S | 8/2017 | Limaye et al. | |
| D795,865 S | 8/2017 | Porter et al. | |
| 9,746,676 B2 | 8/2017 | Osterhout et al. | |
| D796,504 S | 9/2017 | Natsume et al. | |
| D796,506 S | 9/2017 | Natsume et al. | |
| D800,118 S | 10/2017 | Xing et al. | |
| D803,832 S | 11/2017 | Lin et al. | |
| 9,846,308 B2 | 12/2017 | Osterhout | |
| 9,897,822 B2 | 2/2018 | Osterhout et al. | |
| 9,933,622 B2 | 4/2018 | Border et al. | |
| D819,026 S | 5/2018 | Limaye et al. | |
| 10,018,837 B2 | 7/2018 | Border et al. | |
| 10,025,119 B2 | 7/2018 | Huynh | |
| 10,036,889 B2 | 7/2018 | Border et al. | |
| 2002/0021498 A1 | 2/2002 | Ohtaka et al. | |
| 2002/0054272 A1 | 5/2002 | Ebata et al. | |
| 2002/0152425 A1 | 10/2002 | Chaiken et al. | |
| 2002/0183101 A1 | 12/2002 | Oh et al. | |
| 2003/0030912 A1 | 2/2003 | Gleckman et al. | |
| 2004/0008158 A1 | 1/2004 | Chi et al. | |
| 2004/0066363 A1 | 4/2004 | Yamano et al. | |
| 2004/0132509 A1 | 7/2004 | Glezerman | |
| 2005/0237271 A1 | 10/2005 | Yamamoto | |
| 2005/0248717 A1 | 11/2005 | Howell et al. | |
| 2005/0264752 A1 | 12/2005 | Howell et al. | |
| 2005/0280772 A1 | 12/2005 | Hammock et al. | |
| 2006/0061542 A1 | 3/2006 | Stokic et al. | |
| 2006/0109623 A1 | 5/2006 | Harris et al. | |
| 2006/0239629 A1 | 10/2006 | Qi et al. | |
| 2007/0100637 A1 | 5/2007 | McCune et al. | |
| 2007/0296684 A1 | 12/2007 | Thomas et al. | |
| 2008/0122736 A1 | 5/2008 | Ronzani et al. | |

(56) References Cited

U.S. PATENT DOCUMENTS

| | | |
|---|---|---|
| 2008/0125288 A1 | 5/2008 | Case et al. |
| 2008/0143954 A1 | 6/2008 | Abreu et al. |
| 2008/0291277 A1 | 11/2008 | Jacobsen et al. |
| 2009/0013204 A1 | 1/2009 | Kobayashi et al. |
| 2009/0040296 A1 | 2/2009 | Moscato et al. |
| 2009/0108837 A1 | 4/2009 | Johansson et al. |
| 2009/0279180 A1 | 11/2009 | Amitai et al. |
| 2010/0045928 A1 | 2/2010 | Levy et al. |
| 2010/0079356 A1 | 4/2010 | Hoellwarth |
| 2010/0079508 A1 | 4/2010 | Hodge et al. |
| 2010/0130140 A1 | 5/2010 | Waku et al. |
| 2010/0149073 A1 | 6/2010 | Chaum et al. |
| 2010/0259718 A1 | 10/2010 | Hardy |
| 2010/0309426 A1 | 12/2010 | Howell et al. |
| 2011/0130958 A1 | 6/2011 | Stahl et al. |
| 2011/0131495 A1 | 6/2011 | Bull et al. |
| 2011/0159931 A1 | 6/2011 | Boss et al. |
| 2011/0164047 A1 | 7/2011 | Pance et al. |
| 2011/0164163 A1 | 7/2011 | Bilbrey et al. |
| 2011/0196610 A1 | 8/2011 | Waldman et al. |
| 2011/0199171 A1 | 8/2011 | Prest et al. |
| 2011/0201213 A1 | 8/2011 | Dabov et al. |
| 2011/0202823 A1 | 8/2011 | Berger et al. |
| 2011/0213664 A1 | 9/2011 | Osterhout et al. |
| 2011/0234475 A1 | 9/2011 | Endo et al. |
| 2011/0241975 A1* | 10/2011 | Mukawa ............ G02B 27/0172 345/8 |
| 2011/0285764 A1 | 11/2011 | Kimura et al. |
| 2012/0026455 A1 | 2/2012 | Takahashi |
| 2012/0050493 A1 | 3/2012 | Ernst et al. |
| 2012/0062850 A1 | 3/2012 | Travis |
| 2012/0078628 A1 | 3/2012 | Ghulman et al. |
| 2012/0147317 A1* | 6/2012 | Loeb, Jr. ................ G02C 5/124 351/55 |
| 2012/0162270 A1 | 6/2012 | Fleck et al. |
| 2012/0169608 A1 | 7/2012 | Forutanpour et al. |
| 2012/0188245 A1 | 7/2012 | Hyatt et al. |
| 2012/0212593 A1 | 8/2012 | Na'aman et al. |
| 2012/0223885 A1 | 9/2012 | Perez |
| 2012/0242570 A1 | 9/2012 | Kobayashi et al. |
| 2012/0242698 A1 | 9/2012 | Haddick et al. |
| 2012/0250152 A1 | 10/2012 | Larson et al. |
| 2012/0264510 A1 | 10/2012 | Wigdor et al. |
| 2012/0268449 A1 | 10/2012 | Choi et al. |
| 2012/0306850 A1 | 12/2012 | Balan et al. |
| 2012/0307198 A1 | 12/2012 | Ifergan |
| 2012/0326948 A1 | 12/2012 | Crocco et al. |
| 2012/0327116 A1 | 12/2012 | Liu et al. |
| 2013/0009366 A1 | 1/2013 | Hannegan et al. |
| 2013/0044042 A1 | 2/2013 | Olsson et al. |
| 2013/0063695 A1 | 3/2013 | Hsieh |
| 2013/0069985 A1 | 3/2013 | Wong et al. |
| 2013/0083009 A1 | 4/2013 | Geisner et al. |
| 2013/0083055 A1 | 4/2013 | Piemonte et al. |
| 2013/0100259 A1 | 4/2013 | Ramaswamy |
| 2013/0120841 A1 | 5/2013 | Shpunt et al. |
| 2013/0121562 A1 | 5/2013 | Barnum |
| 2013/0135198 A1 | 5/2013 | Hodge et al. |
| 2013/0154913 A1 | 6/2013 | Genc et al. |
| 2013/0185052 A1 | 7/2013 | Boyd et al. |
| 2013/0196757 A1 | 8/2013 | Latta et al. |
| 2013/0201080 A1 | 8/2013 | Evans et al. |
| 2013/0201081 A1 | 8/2013 | Evans et al. |
| 2013/0207970 A1 | 8/2013 | Shpunt et al. |
| 2013/0230215 A1 | 9/2013 | Gurman et al. |
| 2013/0235331 A1* | 9/2013 | Heinrich ................ G02C 11/10 351/158 |
| 2013/0249776 A1 | 9/2013 | Olsson et al. |
| 2013/0250503 A1 | 9/2013 | Olsson et al. |
| 2013/0257622 A1 | 10/2013 | Davalos et al. |
| 2013/0265212 A1 | 10/2013 | Kato et al. |
| 2013/0265227 A1 | 10/2013 | Julian et al. |
| 2013/0293580 A1 | 11/2013 | Spivack et al. |
| 2013/0321265 A1 | 12/2013 | Bychkov et al. |
| 2013/0321271 A1 | 12/2013 | Bychkov et al. |
| 2013/0342981 A1 | 12/2013 | Cox et al. |
| 2014/0028704 A1 | 1/2014 | Wu et al. |
| 2014/0029498 A1 | 1/2014 | Kim et al. |
| 2014/0043682 A1 | 2/2014 | Hussey et al. |
| 2014/0062854 A1 | 3/2014 | Cho |
| 2014/0111864 A1 | 4/2014 | Margulis et al. |
| 2014/0129328 A1 | 5/2014 | Mathew |
| 2014/0146394 A1 | 5/2014 | Tout et al. |
| 2014/0147829 A1 | 5/2014 | Jerauld |
| 2014/0152530 A1 | 6/2014 | Venkatesha et al. |
| 2014/0152558 A1 | 6/2014 | Salter et al. |
| 2014/0152676 A1 | 6/2014 | Rohn et al. |
| 2014/0153173 A1 | 6/2014 | Pombo et al. |
| 2014/0159995 A1 | 6/2014 | Adams et al. |
| 2014/0160055 A1 | 6/2014 | Margolis et al. |
| 2014/0160157 A1 | 6/2014 | Poulos et al. |
| 2014/0160170 A1 | 6/2014 | Lyons |
| 2014/0168735 A1 | 6/2014 | Yuan et al. |
| 2014/0176603 A1 | 6/2014 | Kumar et al. |
| 2014/0177023 A1 | 6/2014 | Gao et al. |
| 2014/0183269 A1 | 7/2014 | Glaser et al. |
| 2014/0206416 A1 | 7/2014 | Aurongzeb et al. |
| 2014/0347572 A1 | 11/2014 | Liu et al. |
| 2014/0354624 A1 | 12/2014 | Chaji |
| 2014/0375545 A1 | 12/2014 | Finocchio et al. |
| 2015/0029088 A1 | 1/2015 | Kim et al. |
| 2015/0042544 A1 | 2/2015 | Sugihara et al. |
| 2015/0084862 A1 | 3/2015 | Sugihara et al. |
| 2015/0145839 A1 | 5/2015 | Hack et al. |
| 2015/0168730 A1 | 6/2015 | Ashkenazi et al. |
| 2015/0178932 A1 | 6/2015 | Wyatt et al. |
| 2015/0198807 A1 | 7/2015 | Hirai |
| 2015/0205117 A1 | 7/2015 | Border et al. |
| 2015/0205132 A1 | 7/2015 | Osterhout et al. |
| 2015/0293587 A1 | 10/2015 | Wilairat et al. |
| 2015/0294627 A1 | 10/2015 | Yoo et al. |
| 2015/0309317 A1* | 10/2015 | Osterhout .......... G02B 27/0176 359/630 |
| 2015/0309534 A1* | 10/2015 | Osterhout ............... G06F 1/163 345/8 |
| 2015/0309995 A1* | 10/2015 | Osterhout ............ G02B 27/017 704/2 |
| 2015/0346496 A1* | 12/2015 | Haddick .......... G02B 27/0176 359/630 |
| 2015/0346511 A1* | 12/2015 | Osterhout .......... G02B 27/0176 351/119 |
| 2015/0347823 A1 | 12/2015 | Monnerat et al. |
| 2015/0382305 A1 | 12/2015 | Drincic |
| 2016/0018646 A1 | 1/2016 | Osterhout et al. |
| 2016/0018647 A1 | 1/2016 | Osterhout et al. |
| 2016/0018648 A1 | 1/2016 | Osterhout et al. |
| 2016/0018649 A1 | 1/2016 | Osterhout et al. |
| 2016/0037833 A1 | 2/2016 | Kriesel |
| 2016/0048025 A1 | 2/2016 | Cazalet |
| 2016/0078278 A1 | 3/2016 | Moore et al. |
| 2016/0085278 A1* | 3/2016 | Osterhout ............... G06F 1/206 361/679.03 |
| 2016/0103325 A1* | 4/2016 | Mirza .................... G02C 5/124 348/335 |
| 2016/0131904 A1 | 5/2016 | Border et al. |
| 2016/0131911 A1 | 5/2016 | Border et al. |
| 2016/0132082 A1 | 5/2016 | Border et al. |
| 2016/0133201 A1 | 5/2016 | Border et al. |
| 2016/0161743 A1 | 6/2016 | Osterhout et al. |
| 2016/0161747 A1 | 6/2016 | Osterhout |
| 2016/0171846 A1 | 6/2016 | Brav et al. |
| 2016/0178904 A1 | 6/2016 | Deleeuw et al. |
| 2016/0187658 A1 | 6/2016 | Osterhout et al. |
| 2016/0209674 A1* | 7/2016 | Montalban ............. G02C 5/122 |
| 2016/0246055 A1 | 8/2016 | Border et al. |
| 2016/0370606 A1 | 12/2016 | Huynh |
| 2017/0031395 A1 | 2/2017 | Osterhout et al. |
| 2017/0099749 A1 | 4/2017 | Nikkhoo et al. |
| 2017/0219831 A1 | 8/2017 | Haddick et al. |
| 2017/0220865 A1 | 8/2017 | Osterhout et al. |
| 2017/0227778 A1 | 8/2017 | Osterhout |
| 2017/0227793 A1 | 8/2017 | Abreu |
| 2017/0235133 A1 | 8/2017 | Border et al. |
| 2017/0235134 A1 | 8/2017 | Border et al. |

(56) References Cited

U.S. PATENT DOCUMENTS

| | | |
|---|---|---|
| 2017/0311483 A1 | 10/2017 | Kawai |
| 2017/0337187 A1 | 11/2017 | Osterhout |
| 2017/0343810 A1 | 11/2017 | Bietry et al. |
| 2017/0351098 A1 | 12/2017 | Osterhout et al. |
| 2018/0003988 A1 | 1/2018 | Osterhout |
| 2018/0024369 A1 | 1/2018 | Kato |
| 2018/0143451 A1 | 5/2018 | Osterhout et al. |
| 2018/0267302 A1 | 9/2018 | Border et al. |

FOREIGN PATENT DOCUMENTS

| | | |
|---|---|---|
| EP | 2207164 A2 | 7/2010 |
| EP | 2486450 A1 | 8/2012 |
| EP | 2502410 A1 | 9/2012 |
| JP | 2009171505 A | 7/2009 |
| JP | 5017989 B2 | 9/2012 |
| JP | 2012212990 A | 11/2012 |
| KR | 1020110101944 A | 9/2011 |
| WO | 9414152 A1 | 6/1994 |
| WO | 03023756 A1 | 3/2003 |
| WO | WO2010101919 A1 | 9/2010 |
| WO | 2011143655 A1 | 11/2011 |
| WO | 2012058175 A1 | 5/2012 |
| WO | 2013050650 A1 | 4/2013 |
| WO | 2013103825 A1 | 7/2013 |
| WO | 2013110846 A1 | 8/2013 |
| WO | 2013170073 A1 | 11/2013 |
| WO | 2013176079 A1 | 11/2013 |
| WO | 2016073734 A1 | 5/2016 |
| WO | WO2016132974 A1 | 8/2016 |
| WO | 2016205601 A1 | 12/2016 |
| WO | 2017100074 A1 | 6/2017 |
| WO | 2018044537 A1 | 3/2018 |

OTHER PUBLICATIONS

US 8,792,178 B2, 07/2014, Totani et al. (withdrawn)
U.S. Appl. No. 16/130,268, filed Sep. 13, 2018, Pending.
U.S. Appl. No. 15/802,727, filed Nov. 3, 2017, Pending.
U.S. Appl. No. 29/589,483, filed Dec. 31, 2016, Pending.
U.S. Appl. No. 29/589,676, filed Jan. 4, 2017, Allowed.
U.S. Appl. No. 29/575,093, filed Aug. 22, 2016, Pending.
U.S. Appl. No. 29/581,145, filed Oct. 17, 2016, Pending.
"Audio Spotlight", by Holosonics, http://www.holosonics.com, accessed Jul. 3, 2014, 3 pages.
"Sound from Ultrasound", Wikipedia entry, http://en.m.wikipedia.org/wiki/Sound_from_ultrasound, accessed Jul. 3, 2014, 13 pages.
15782758.5, "European Application Serial No. 15782758.5, Extended European Search Report dated Nov. 27, 2017", Osterhout Group, Inc., 10 Pages.
15857713.0, "European Application Serial No. 15857713.0, Extended European Search Report Received dated Oct. 16, 2017", Osterhout Group, Inc., 7 Pages.
Clements-Cortes, Amy et al., "Short-Term Effects of Rhythmic Sensory Stimulation in Alzheimer's Disease: An Exploratory Pilot Study", Journal of Alzheimer's Disease 52 (2016) DOI 10.3233/JAD-160081 IOS Press, Handling Associate Editor: George Acquaah-Mensah, Feb. 9, 2016, 651-660.
Osterhout, Ralph , "Commercial and Social Implications", https://infinityleap.com/interview-the-ceo-of-osterhout-design-group-ralph-osterhout/>, Aug. 26, 2017, 12 pages.
PCT/US2015/026704, "International Application Serial No. PCT/US2015/026704, International Preliminary Report on Patentability and Written Opinion dated Nov. 3, 2016", Osterhout Group, Inc., 10 Pages.
PCT/US2015/026704, "International Search Report and Written Opinion dated Aug. 21, 2015", Osterhout Group, Inc., 15 pages.
PCT/US2015/059264, "International Application Serial No. PCT/US2015/059264, International Preliminary Report on Patentability and Written Opinion dated May 18, 2017", Osterhout Group, Inc., 8 Pages.
PCT/US2015/059264, "International Application Serial No. PCT/US2015/059264, International Search Report and Written Opinion dated Feb. 19, 2016", Osterhout Group, Inc., 11 Pages.
PCT/US2016/038008, "Application Serial No. PCT/US2016/038008, International Search Report and Written Opinion dated Oct. 27, 2016", Osterhout Group, Inc., 8 pages.
PCT/US2016/038008, "International Application Serial No. PCT/US2016/038008, International Preliminary Report on Patentability dated Dec. 28, 2017", Osterhout Group, Inc., 6 Pages.
PCT/US2016/064441, "Application Serial No. PCT/US2016/064441, International Search Report and Written Opinion dated Feb. 7, 2017", Osterhout Group, Inc., 11 pages.
PCT/US2016/064441, "International Application Serial No. PCT/US2016/064441, International Preliminary Report on Patentability and Written Opinion dated Jun. 21, 2018", Osterhout Group, Inc., 9 Pages.
PCTUS2017046701, "Application Serial No. PCTUS2017046701, International Search Report and the Written Opinion dated Nov. 6, 2017", 7 pages.
Schedwill, "Bidirectional OLED Microdisplay", Fraunhofer Research Institution for Organics, Materials and Electronic Device Comedd, Apr. 11, 2014, 2 pages.
Vogel, et al., "Data glasses controlled by eye movements", Information and communication, Fraunhofer-Gesellschaft, Sep. 22, 2013, 2 pages.
Ye, Hui et al., "High Quality Voice Morphing", Cambridge University Engineering Department Trumpington Street, Cambridge, England, CB2 1PZ, 2004, I-9-I-11.
European Search Report dated Mar. 13, 2020, for EP Application No. 17847193.4, eight pages.

\* cited by examiner

ADJUSTABLE NOSE BRIDGE ASSEMBLY FOR HEADWORN COMPUTER

BACKGROUND

Field of the Invention

This invention relates to head worn computing. More particularly, this invention relates to 3-way adjustable nose bridge assemblies for head-worn computers.

Description of Related Art

Wearable computing systems have been developed and are beginning to be commercialized. Many problems persist in the wearable computing field that need to be resolved to make them meet the demands of the market.

SUMMARY

Aspects of the present invention relate to 3-way adjustable nose bridge assemblies for head worn computers.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE DRAWINGS

Embodiments are described with reference to the following Figures. The same numbers may be used throughout to reference like features and components that are shown in the Figures.

While the invention has been described in connection with certain preferred embodiments, other embodiments would be understood by one of ordinary skill in the art and are encompassed herein.

DETAILED DESCRIPTION OF THE PREFERRED EMBODIMENT(S)

Aspects of the present invention relate to head-worn computing ("HWC") systems. HWC involves, in some instances, a system that mimics the appearance of head-worn glasses or sunglasses. The glasses may be a fully developed computing platform, such as including computer displays presented in each of the lenses of the glasses to the eyes of the user. In embodiments, the lenses and displays may be configured to allow a person wearing the glasses to see the environment through the lenses while also seeing, simultaneously, digital imagery, which forms an overlaid image that is perceived by the person as a digitally augmented image of the environment, or augmented reality ("AR").

HWC involves more than just placing a computing system on a person's head. The system may need to be designed as a lightweight, compact and fully functional computer display, such as wherein the computer display includes a high resolution digital display that provides a high level of emersion comprised of the displayed digital content and the see-through view of the environmental surroundings. User interfaces and control systems suited to the HWC device may be required that are unlike those used for a more conventional computer such as a laptop. For the HWC and associated systems to be most effective, the glasses may be equipped with sensors to determine environmental conditions, geographic location, relative positioning to other points of interest, objects identified by imaging and movement by the user or other users in a connected group, and the like. The HWC may then change the mode of operation to match the conditions, location, positioning, movements, and the like, in a method generally referred to as a contextually aware HWC. The glasses also may need to be connected, wirelessly or otherwise, to other systems either locally or through a network. Controlling the glasses may be achieved through the use of an external device, automatically through contextually gathered information, through user gestures captured by the glasses sensors, and the like. Each technique may be further refined depending on the software application being used in the glasses. The glasses may further be used to control or coordinate with external devices that are associated with the glasses.

Figure 1:
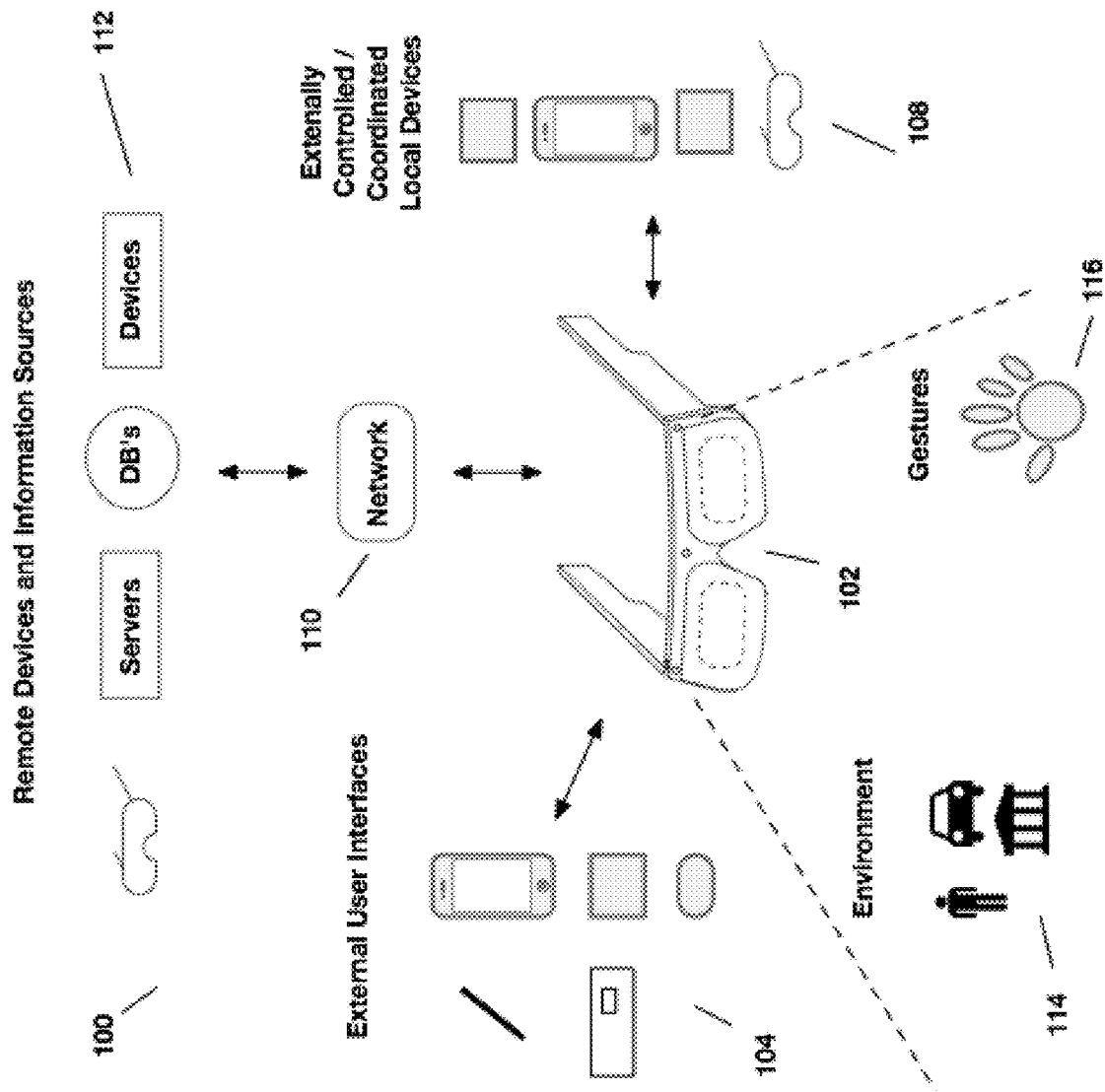
FIG. 1 illustrates a head worn computing system in accordance with the principles of the present invention.

Referring to FIG. 1, an overview of the HWC system 100 is presented. As shown, the HWC system 100 comprises a HWC 102, which in this instance is configured as glasses to be worn on the head with sensors such that the HWC 102 is aware of the objects and conditions in the environment 114. In this instance, the HWC 102 also receives and interprets control inputs such as gestures and movements 116. The HWC 102 may communicate with external user interfaces 104. The external user interfaces 104 may provide a physical user interface to take control instructions from a user of the HWC 102 and the external user interfaces 104 and the HWC 102 may communicate bi-directionally to affect the user's command and provide feedback to the external device 108. The HWC 102 may also communicate bi-directionally with externally controlled or coordinated local devices 108. For example, an external user interface 104 may be used in connection with the HWC 102 to control an externally controlled or coordinated local device 108. The externally controlled or coordinated local device 108 may provide feedback to the HWC 102 and a customized GUI may be presented in the HWC 102 based on the type of device or specifically identified device 108. The HWC 102 may also interact with remote devices and information sources 112 through a network connection 110. Again, the external user interface 104 may be used in connection with the HWC 102 to control or otherwise interact with any of the remote devices 108 and information sources 112 in a similar way as when the external user interfaces 104 are used to control or otherwise interact with the externally controlled or coordinated local devices 108. Similarly, HWC 102 may interpret gestures 116 (e.g captured from forward, downward, upward, rearward facing sensors such as camera(s), range finders, IR sensors, etc.) or environmental conditions sensed in the environment 114 to control either local or remote devices 108 or 112.

We will now describe each of the main elements depicted on FIG. 1 in more detail; however, these descriptions are intended to provide general guidance and should not be construed as limiting. Additional description of each element may also be further described herein.

The HWC 102 is a computing platform intended to be worn on a person's head. The HWC 102 may take many different forms to fit many different functional requirements. In some situations, the HWC 102 will be designed in the form of conventional glasses. The glasses may or may not have active computer graphics displays. In situations where the HWC 102 has integrated computer displays the displays may be configured as see-through displays such that the digital imagery can be overlaid with respect to the user's view of the environment 114. There are a number of see-through optical designs that may be used, including ones that have a reflective display (e.g. LCoS, DLP), emissive displays (e.g. OLED, LED), hologram, TIR waveguides, and the like. In embodiments, lighting systems used in connection with the display optics may be solid state lighting systems, such as LED, OLED, quantum dot, quantum dot LED, etc. In addition, the optical configuration may be monocular or binocular. It may also include vision corrective optical components. In embodiments, the optics may be packaged as contact lenses. In other embodiments, the HWC 102 may be in the form of a helmet with a see-through shield, sunglasses, safety glasses, goggles, a mask, fire helmet with see-through shield, police helmet with see through shield, military helmet with see-through shield, utility form customized to a certain work task (e.g. inventory control, logistics, repair, maintenance, etc.), and the like.

The HWC 102 may also have a number of integrated computing facilities, such as an integrated processor, integrated power management, communication structures (e.g. cell net, WiFi, Bluetooth, local area connections, mesh connections, remote connections (e.g. client server, etc.)), and the like. The HWC 102 may also have a number of positional awareness sensors, such as GPS, electronic compass, altimeter, tilt sensor, IMU, and the like. It may also have other sensors such as a camera, rangefinder, hyperspectral camera, Geiger counter, microphone, spectral illumination detector, temperature sensor, chemical sensor, biologic sensor, moisture sensor, ultrasonic sensor, and the like.

The HWC 102 may also have integrated control technologies. The integrated control technologies may be contextual based control, passive control, active control, user control, and the like. For example, the HWC 102 may have an integrated sensor (e.g. camera) that captures user hand or body gestures 116 such that the integrated processing system can interpret the gestures and generate control commands for the HWC 102. In another example, the HWC 102 may have sensors that detect movement (e.g. a nod, head shake, and the like) including accelerometers, gyros and other inertial measurements, where the integrated processor may interpret the movement and generate a control command in response. The HWC 102 may also automatically control itself based on measured or perceived environmental conditions. For example, if it is bright in the environment the HWC 102 may increase the brightness or contrast of the displayed image. In embodiments, the integrated control technologies may be mounted on the HWC 102 such that a user can interact with it directly. For example, the HWC 102 may have a button(s), touch capacitive interface, and the like.

As described herein, the HWC 102 may be in communication with external user interfaces 104. The external user interfaces may come in many different forms. For example, a cell phone screen may be adapted to take user input for control of an aspect of the HWC 102. The external user interface may be a dedicated UI, such as a keyboard, touch surface, button(s), joy stick, and the like. In embodiments, the external controller may be integrated into another device such as a ring, watch, bike, car, and the like. In each case, the external user interface 104 may include sensors (e.g. IMU, accelerometers, compass, altimeter, and the like) to provide additional input for controlling the HWD 104.

As described herein, the HWC 102 may control or coordinate with other local devices 108. The external devices 108 may be an audio device, visual device, vehicle, cell phone, computer, and the like. For instance, the local external device 108 may be another HWC 102, where information may then be exchanged between the separate HWCs 108.

Similar to the way the HWC 102 may control or coordinate with local devices 106, the HWC 102 may control or coordinate with remote devices 112, such as the HWC 102 communicating with the remote devices 112 through a network 110. Again, the form of the remote device 112 may have many forms. Included in these forms is another HWC 102. For example, each HWC 102 may communicate its GPS position such that all the HWCs 102 know where all of HWC 102 are located.

Figure 2:
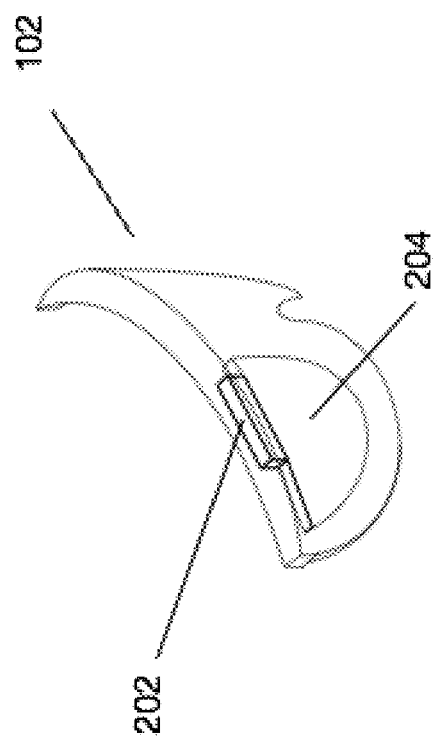
FIG. 2 illustrates a head worn computing system with optical system in accordance with the principles of the present invention.

FIG. 2 illustrates a HWC 102 with an optical system that includes an upper optical module 202 and a lower optical module 204. While the upper and lower optical modules 202 and 204 will generally be described as separate modules, it should be understood that this is illustrative only and the present invention includes other physical configurations, such as that when the two modules are combined into a single module or where the elements making up the two modules are configured into more than two modules. In embodiments, the upper module 202 includes a computer controlled display (e.g. LCoS, DLP, OLED, etc.) and image light delivery optics. In embodiments, the lower module includes eye delivery optics that are configured to receive the upper module's image light and deliver the image light to the eye of a wearer of the HWC. In FIG. 2, it should be noted that while the upper and lower optical modules 202 and 204 are illustrated in one side of the HWC such that image light can be delivered to one eye of the wearer, that it is envisioned by the present invention that embodiments will contain two image light delivery systems, one for each eye. It should also be noted that while many embodiments refer to the optical modules as "upper" and "lower" it should be understood that this convention is being used to make it easier for the reader and that the modules are not necessarily located in an upper-lower relationship. For example, the image generation module may be located above the eye delivery optics, below the eye delivery optics, on a side of the eye delivery optics, or otherwise positioned to satisfy the needs of the situation and/or the HWC 102 mechanical and optical requirements.

An aspect of the present invention relates to the mechanical and electrical construction of a side arm of a head worn computer. In general, when a head worn computer takes the form of glasses, sun-glasses, certain goggles, or other such forms, two side arms are included for mounting and securing the had worn computer on the ear's of a person wearing the head worn computer. In embodiments, the side arms may also contain electronics, batteries, wires, antennas, computer processors, computer boards, etc. In embodiments, the side arm may include two or more sub assemblies. For example, as will be discussed in more detail below, the side arm may include a temple section and an ear horn section. The two sections may, for example, be mechanically arranged to allow an ear horn section to move such that both side arms can fold into a closed position.

Figure 3:
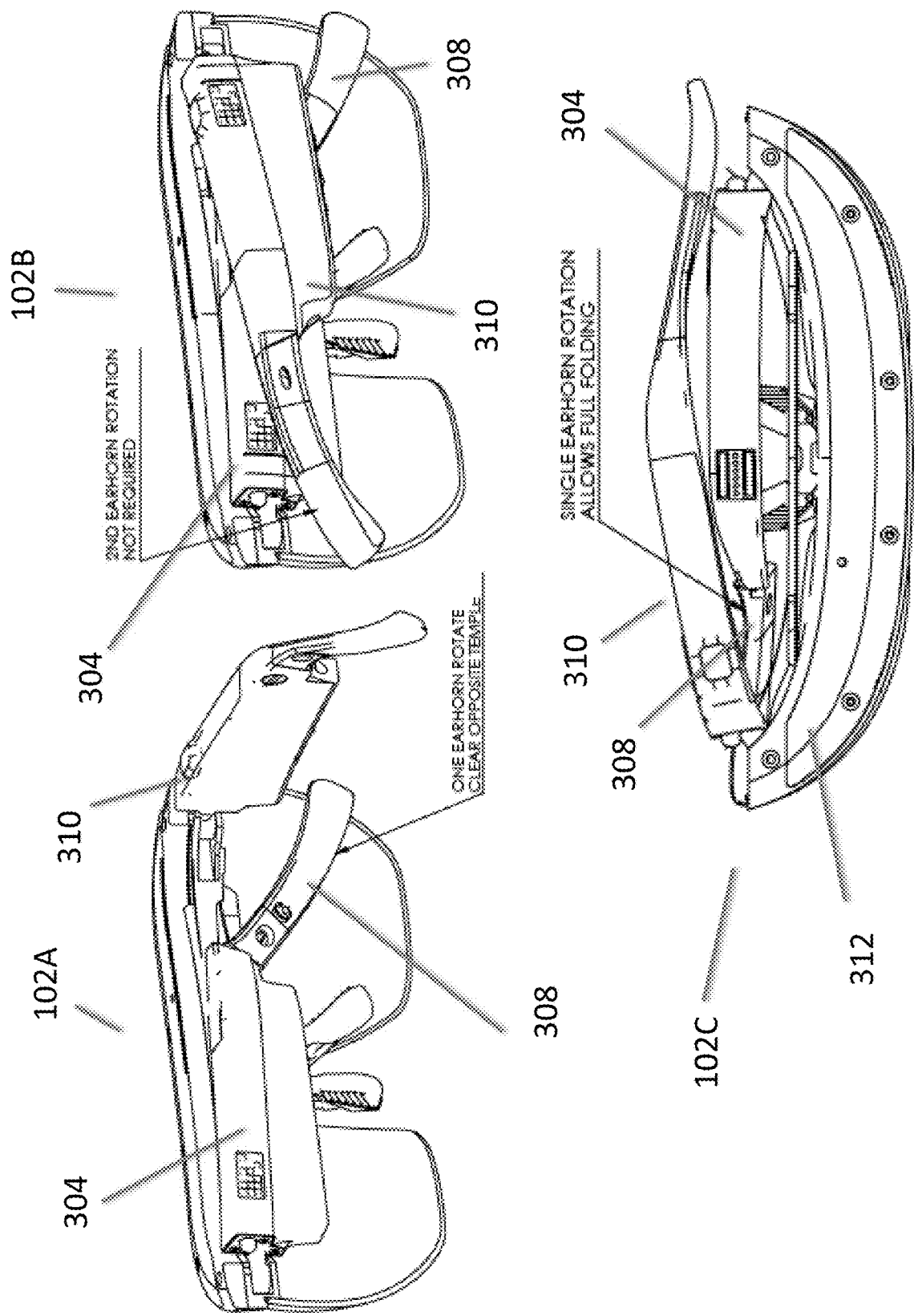
FIG. 3 illustrates three views of a head worn computer in accordance with the principles of the present invention.

FIG. 3 illustrates three separate views 102A, 102B and 102C of a head worn computer 102 according to the principles of the present invention. Turning to the head worn computer illustrated as 102A, one side arm of the HWC 102 is folded into its closed position. The ear horn section 308 of the side arm is rotated relative to its temple section 304 to create space relative to the other side arm 310 so when the other side arm is moved into its closed position it can fully close. In a situation where the ear horn did not rotate to create the space (not illustrated) the ear horn would physically interfere with the other side arm 310, when the side arm was in the closed position, and prevent the other side arm 310 from fully closing. The HWC 102B view illustrates the HWC 102B with both side arms folded into a fully closed position. Note that the ear horn 308 is in the rotated position with respect to its temple section 304 such that the other arm 310 closed without interfering with the ear horn 308. The HWC 102C view also illustrates both arms in closed positions with the ear horn 308 rotated to create the space for the other arm 310 to fully close. FIG. 3 also illustrates a portion of the HWC 102 where electronics may be housed in a top mount 312. The top mount may contain electronics, sensors, optics, processors, memory, radios, antennas, etc.

Figure 4:
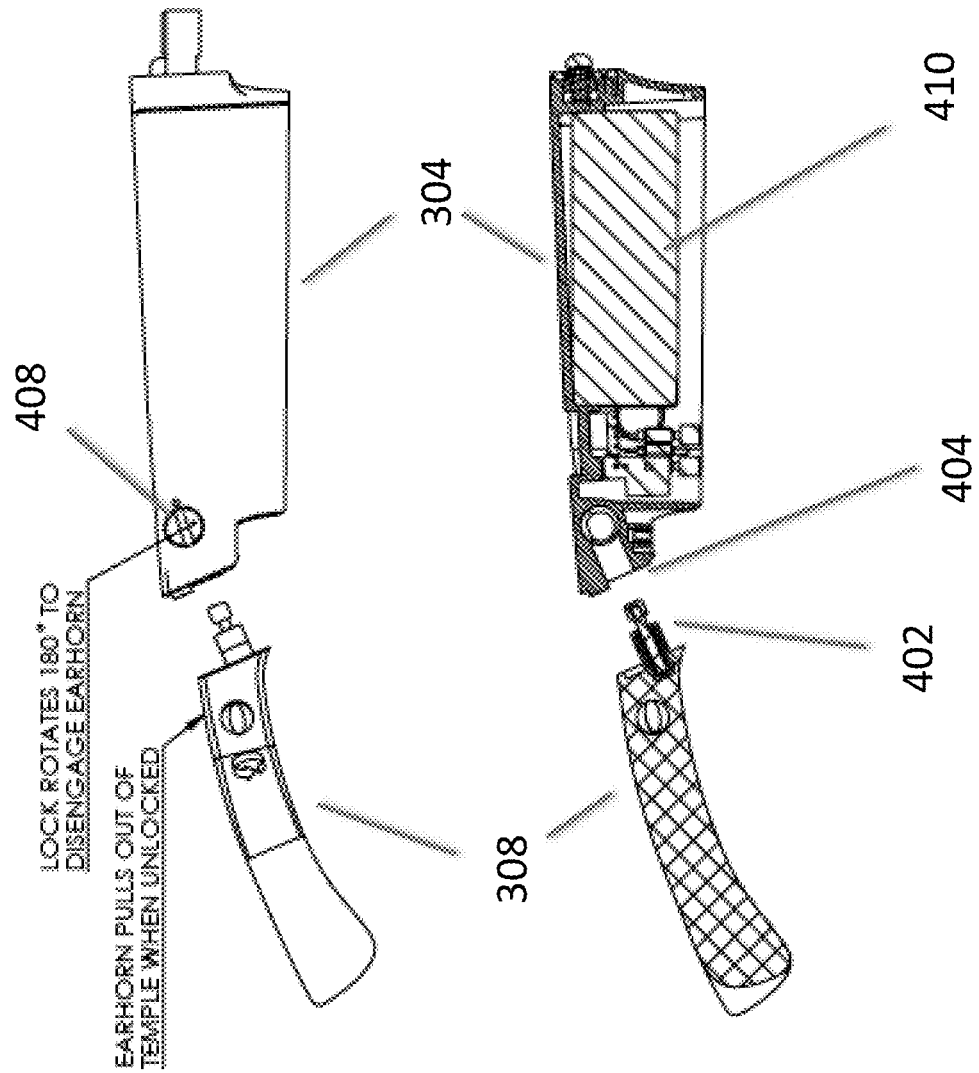
FIG. 4 illustrates a temple and ear horn in accordance with the principles of the present invention.

FIG. 4 illustrates a side arm configuration in accordance with the principles of the present invention. In this embodiment, the side arm includes two sub assemblies: the temple section 304 and the ear horn 308. FIG. 4 illustrates two views of the side arm assembly, one from an outer perspective and one from a sectioned perspective. The ear horn includes a pin 402 that is designed to fit into a hole 404 and to be secured by connector 408. The connector 408 is rotatable and in one position locks the pin 402 in place and in another position unsecures the pin 402 such that the ear horn 308 can be removed and re-attached to the temple section 304. This allows the detachment and re-attachment of the ear horn 308 from the temple section 304. This also allows for the sale of different ear horns 308 for replacement, of which a variety of colors and patterns may be offered. In embodiments, the temple section 304 may include a battery compartment 410 and other electronics, wires, sensors, processors, etc.

Figure 5:
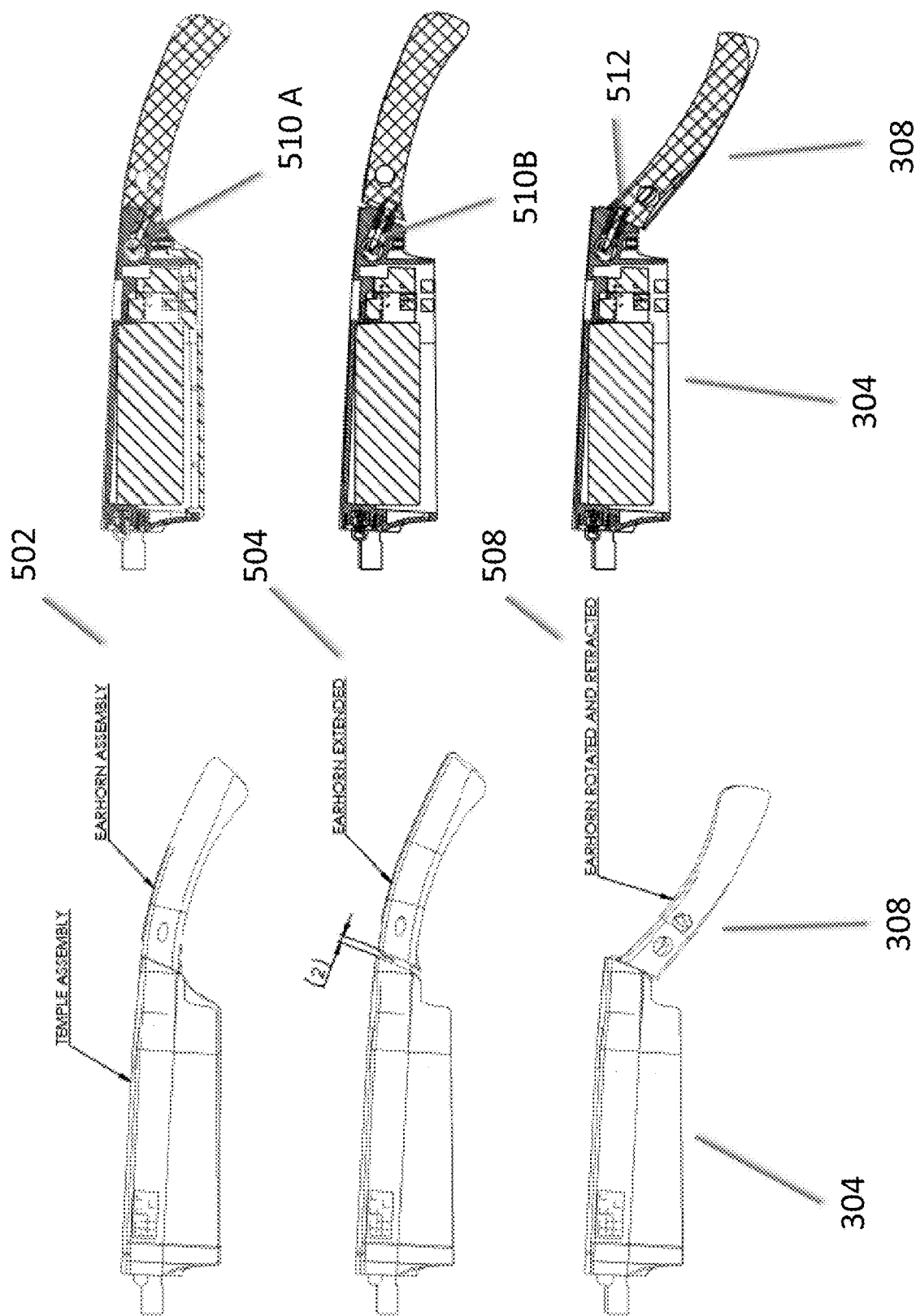
FIG. 5 illustrates a temple and ear horn assembly in various states in accordance with the principles of the present invention.

FIG. 5 illustrates several views of a HWC side arm with temple 304 and ear horn 308 sections. The views include outer perspectives and cross sections as well as various states of the security of the ear horn 308 with the temple section 304. Figure set 504 illustrates the ear horn 308 and the temple section 304 in a secure un-rotated position. The same pin 402 and connector 408 system described in connection with FIG. 4 is illustrated in the cross sections of FIG. 5. In the secured un-rotated position the pin is pulled internally within the temple section firmly such that it stays in place. Figure set 504 illustrates a state where the ear horn 308 is separated from the temple section 304. This state is achieved when pressure is used to pull on the ear horn 308. In embodiments, the pressure is exerted by a user pulling on the ear horn 308, which compresses a spring 510B that is mechanically associated with the pin 402 in the ear horn 308. The mechanism uses the spring to maintain pressure on the pin 402 to maintain connection with the connector 408 when the connector 408 is in a position to lock the pin 402 in position. Figure set 508 illustrates a state where, after the ear horn 308 has been pulled into the state described in connection with state 504, the ear horn 308 is rotated about the pin 402. This puts the ear horn 308 in a rotated position as described herein such that the first arm, with this rotated ear horn 308, does not interfere with the closure of the other arm 310 when the two arms are folded into the closed position.

Figure 6:
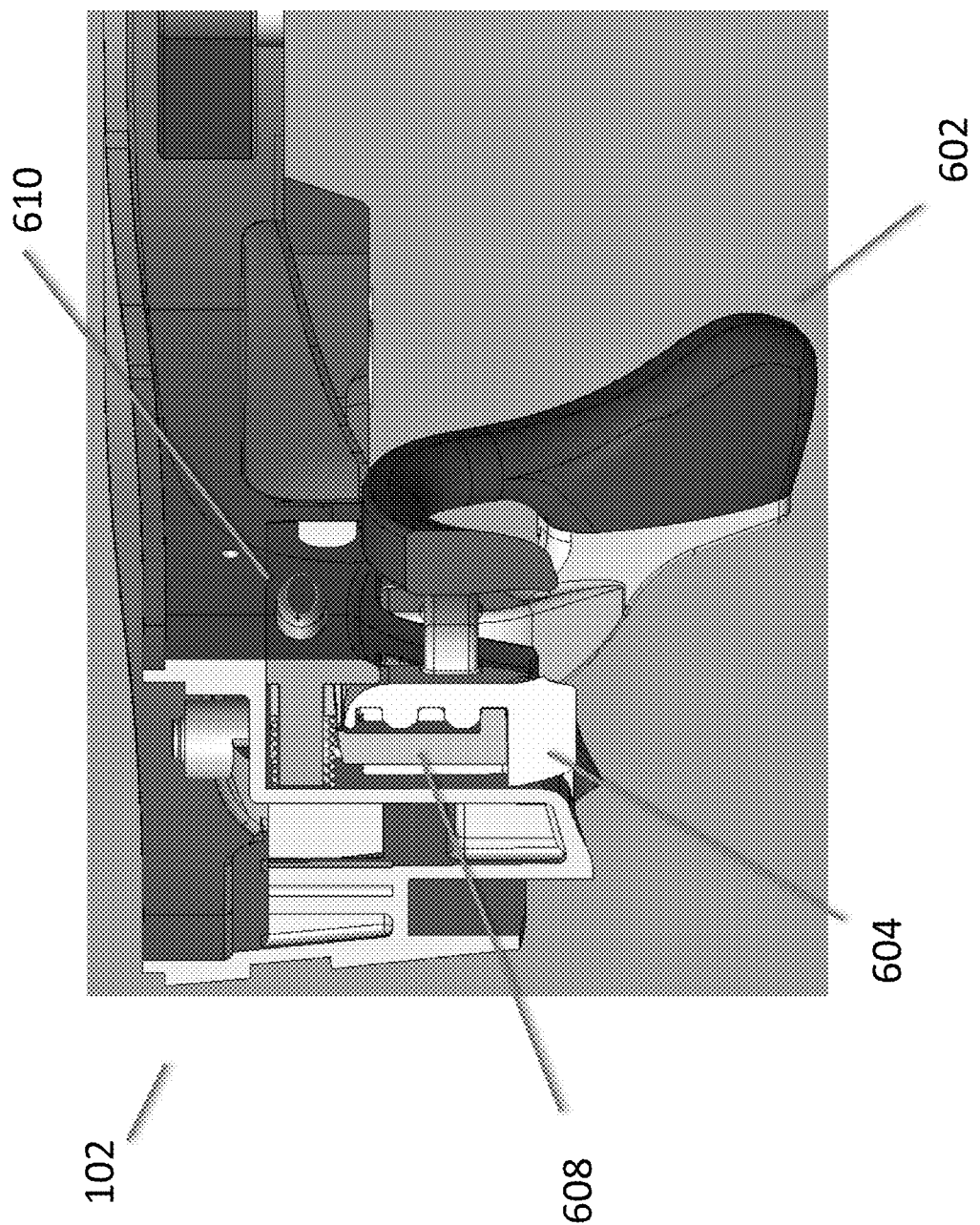
FIG. 6 illustrates an adjustable nose bridge assembly in accordance with the principles of the present invention.
Figure 7:
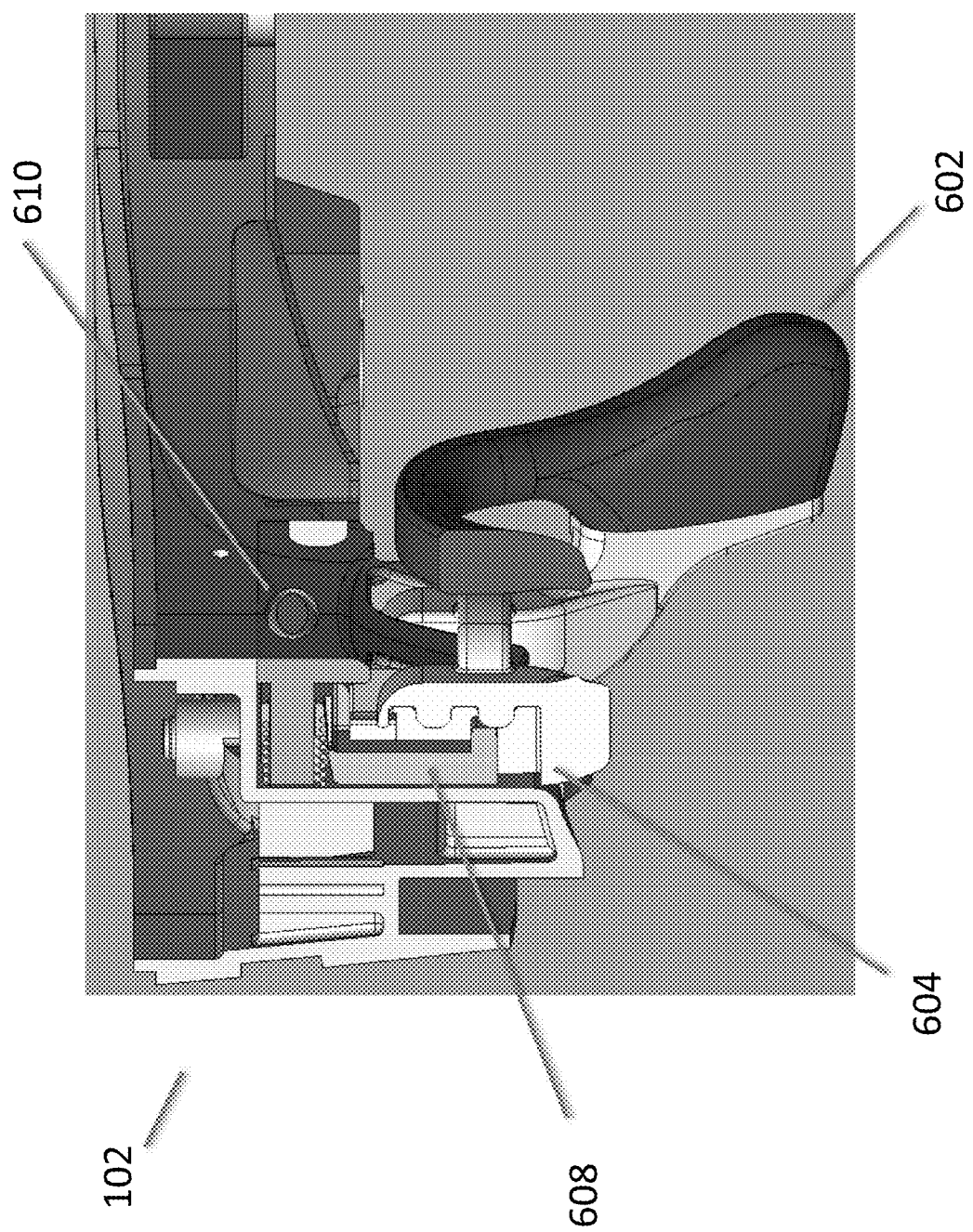
FIG. 7 illustrates an adjustable nose bridge assembly in accordance with the principles of the present invention.

An aspect of the present invention relates to an adjustable nose bridge. An adjustable nose bridge may be important with head worn computers, especially those with computer displays, to ensure comfort and alignment of the displays and/or other portions of the head worn computer. FIG. 6 illustrates a HWC 102 with an adjustable nose bridge 602. The nose bridge is adjustable through a mechanism in the HWC 102. In embodiments, the mechanism includes a fixed notched attachment 604, a movable pin 608 adapted to fit into the notches of the notched attachment 604, and a selection device 610 that is attached to the movable pin 608. The movable pin 608 and nose bridge 602 are connected such that the as the movable pin 608 shifts in position the nose bridge 602 moves in position as well. The selection device 610 causes the movable pin 608 to engage and disengage with the fixed notched attachment 604 when presses and allowed to retract. As illustrated in FIG. 6, the selection device 610 is not in a pressed position so the movable pin 608 is engaged with the notched attachment 604 such that the nose bridge is securely attached in a stable position. FIG. 7 illustrates a scenario where the selection device is pressed, or activated, such that the moveable pin 608 is no longer engaged with the fixed notched attachment 604. This allows the nose bridge 602 to move up and down with respect to the rest of the HWC 102. Once the movable pin 608 aligns with a notch of the notched attachment 604, the two parts may engage to re-secure the nose bridge in the HWC 102.

In embodiments, a side arm of the HWC 102 may include an audio jack (not shown) and the audio jack may be magnetically attachable to the side arm. For example, the temple section 304 or ear horn section 308 may have a magnetically attachable audio jack with audio signal wires associated with an audio system in the HWC 102. The magnetic attachment may include one or more magnets on one end (e.g. on the head phone end or the side arm end) and magnetically conductive material on the other end. In other embodiments, both ends of the attachment may have magnets, of opposite polarization, to create a stronger magnetic bond for the headphone). In embodiments, the audio signal wires or magnetic connection may include a sensor circuit to detect when the headphone is detached from the HWC 102. This may be useful in situations where the wearer is wearing the headphones during a period when there is not constant audio processing (e.g. listening for people to talk with periods of silence). In embodiments, the other side's headphone may play a tone, sound, signal, etc. in the event a headphone is detached. In embodiments, an indication of the detachment may be displayed in the computer display.

In embodiments, the HWC 102 may have a vibration system that vibrates to alert the wearer of certain sensed conditions. In embodiments, the vibration system (e.g. an actuator that moves quickly to cause vibration in the HWC 102) may be mounted in a side arm (e.g. the temple portion 304, or ear horn 308), in the top mount 312, etc. In embodiments, the vibration system may be capable of causing different vibration modes that may be indicative of different conditions. For example, the vibration system may include a multi-mode vibration system, piezo-electric vibration system, variable motor, etc, that can be regulated through computer input and a processor in the HWC 102 may send control signals to the vibration system to generate an appropriate vibration mode. In embodiments, the HWC 102 may be associated with other devices (e.g. through Bluetooth, WiFi, etc.) and the vibratory control signals may be associated with sensors associated with the other device. For example, the HWC 102 may be connected to a car through Bluetooth such that sensor(s) in the car can cause activation of a vibration mode for the vibration system. The car, for example, may determine that a risk of accident is present (e.g. risk of the driver falling asleep, car going out of its lane, a car in front of the wearer is stopped or slowing, radar in the car indicates a risk, etc.) and the car's system may then send a command, via the Bluetooth connection, to the HWC 102 to cause a vibratory tone to be initiated in the HWC 102.

In embodiments, the connection between the speaker system and the HWC 102 may be positioned other than under the temple section. It may be positioned on a side, top, bottom, end of a section of the side arm, for example. It may be positioned on the front bridge, for example. In embodiments, the speaker system may be connected to a top or side portion and the speaker may be further positioned to face forward, away from the user's ear. This may be a useful configuration for providing sound to others. For example, such a configuration may be used when the user wants to provide translations to a person nearby. The user may speak in a language, have the language translated, and then spoken through the forward facing speakers.

The removable nature of the speaker systems may be desirable for breakaway situations so a snag does not tear the glasses from the user or pull hard on the user's ear. The removable nature may also be useful for modularity configurations where the user wants to interchange speaker types or attach other accessories. For example, the user may want ear buds at one point and an open ear speaker configuration at another point and the user may be able to make the swap with ease given this configuration. The port on the HWC 102 may also be adapted for other accessories that include lights or sensors for example. The accessory may have an ambient light sensor to assist with the control of the lighting and contrast systems used in the HWC 102 displays, for example. In embodiments, the speaker port may be used as a charging port for the HWC 102 or data port for the HWC 102.

Another aspect of the present invention relates to an adjustable nose bridge assembly of a head-worn computer. Positioning of a head-worn computer can be complicated by the nature of the computer displays that are intended to be positioned in front of the user's eyes along with the fact that people have different shaped heads, noses, eye positions, etc. The inventors have appreciated the difficulties in such positioning and have developed an intuitive mechanism for a multi-axis adjustment system for the head-worn computer. In embodiments, the multi-axis adjustment system provides for vertical adjustment of the nose bridge, persistent rotational settings for the nose pads, and persistent outward/inward flex of the nose pads. Such a system is designed to be used on a wide variety of nose shapes and head sizes.

Figure 8:
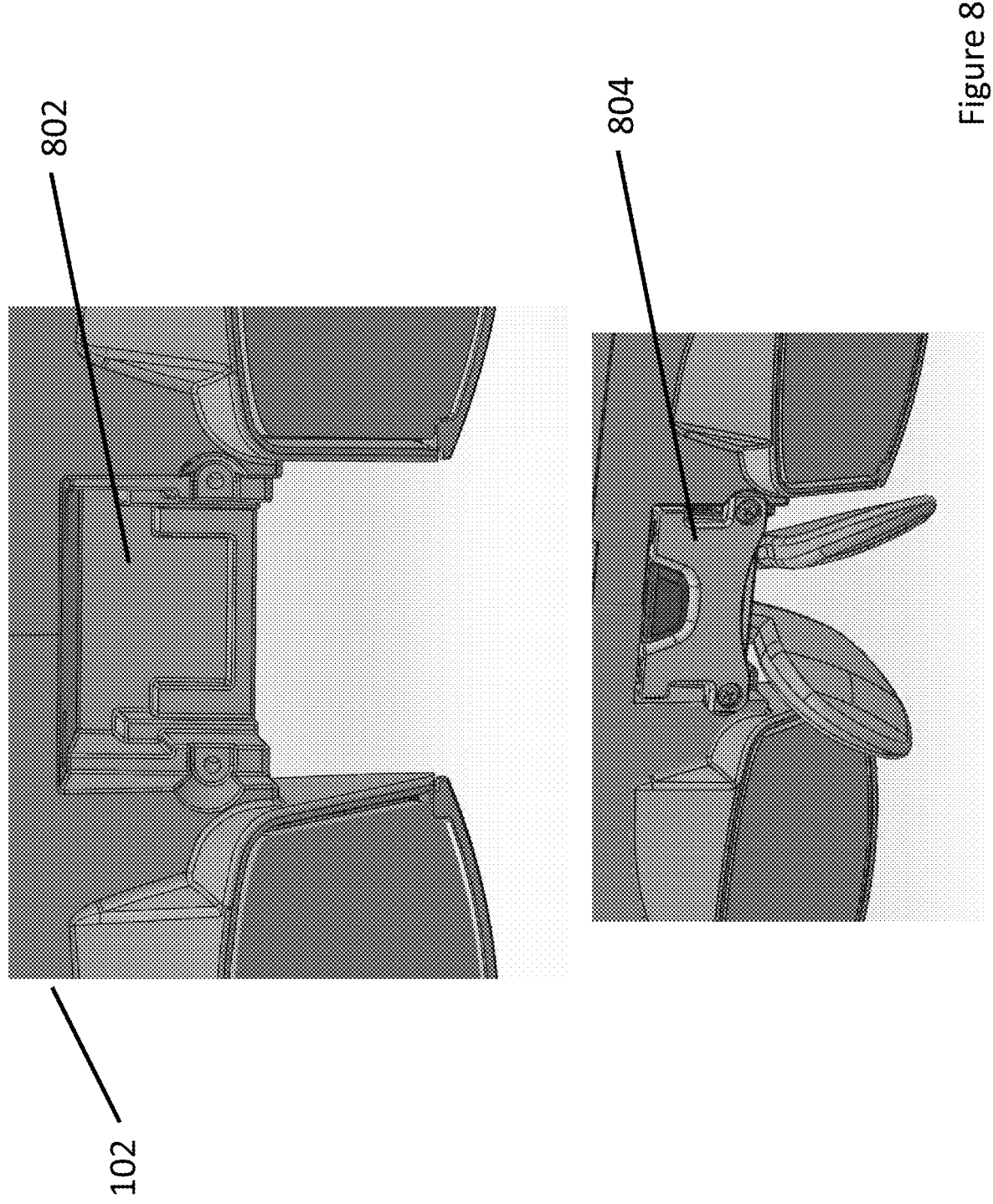
FIGS. 8-10 illustrate adjustable nose bridge assemblies in accordance with the principles of the present invention.

FIG. 8 illustrates a portion of a head-worn computer 102 with a mounting area 802 for an adjustable nose bridge assembly 804.

Figure 9:
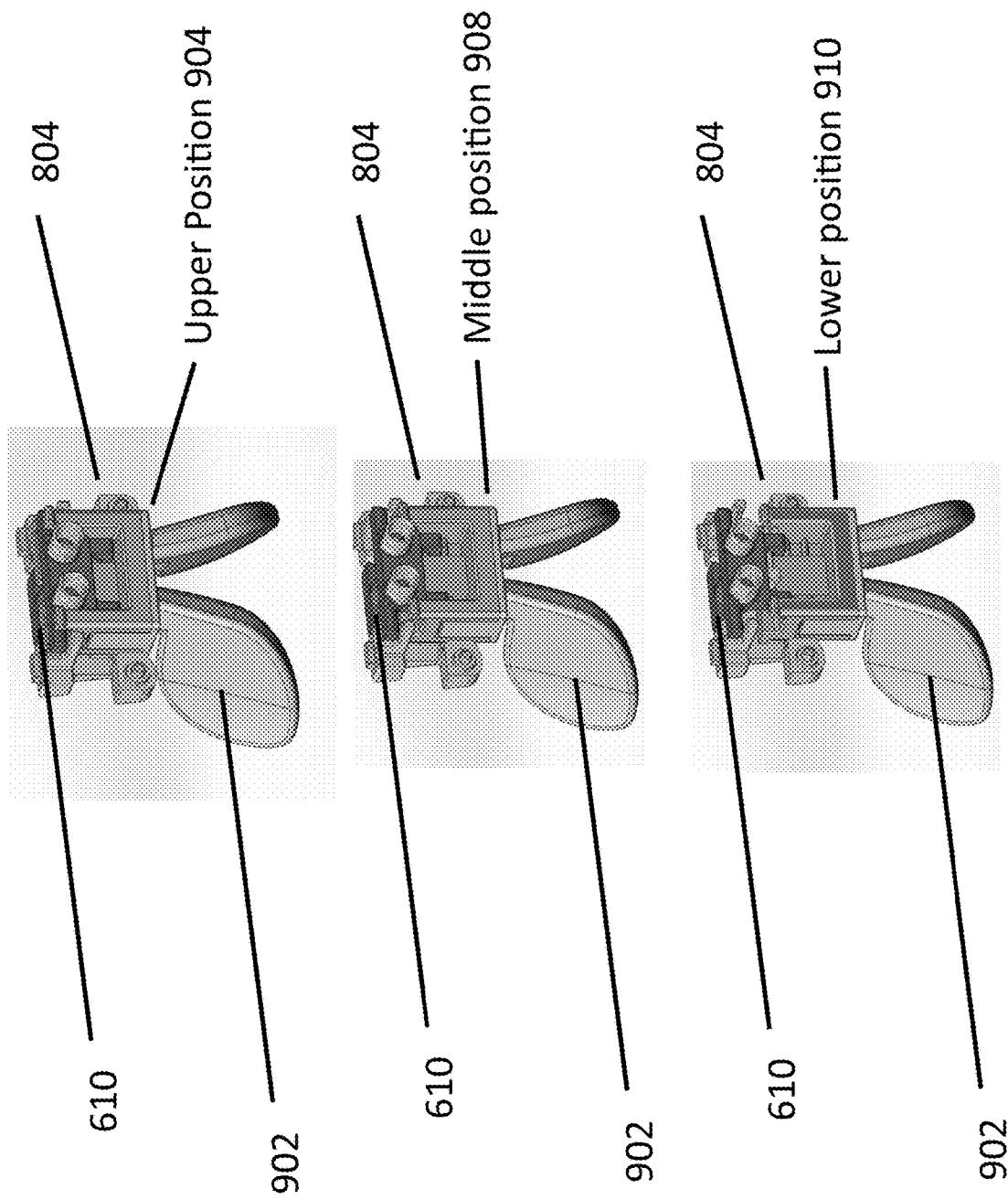

FIG. 9 illustrates an an adjustable nose bridge assembly 804 in three different vertical positions 904, 908, and 910. In embodiments, the adjustable nose bridge 804 has a selection device 610 and nose pads 902. In embodiments, the selection device is a button, or other suitable user interface, and is mechanically arranged such that pushing the button releases the nose bridge such that it can be moved up and down. In this embodiment, the button engages with a tooth or other such feature to hold the nose bridge in place. In embodiments, the adjustment may be continuous or discrete and may be mechanically, electrically, or otherwise controlled.

Figure 10:
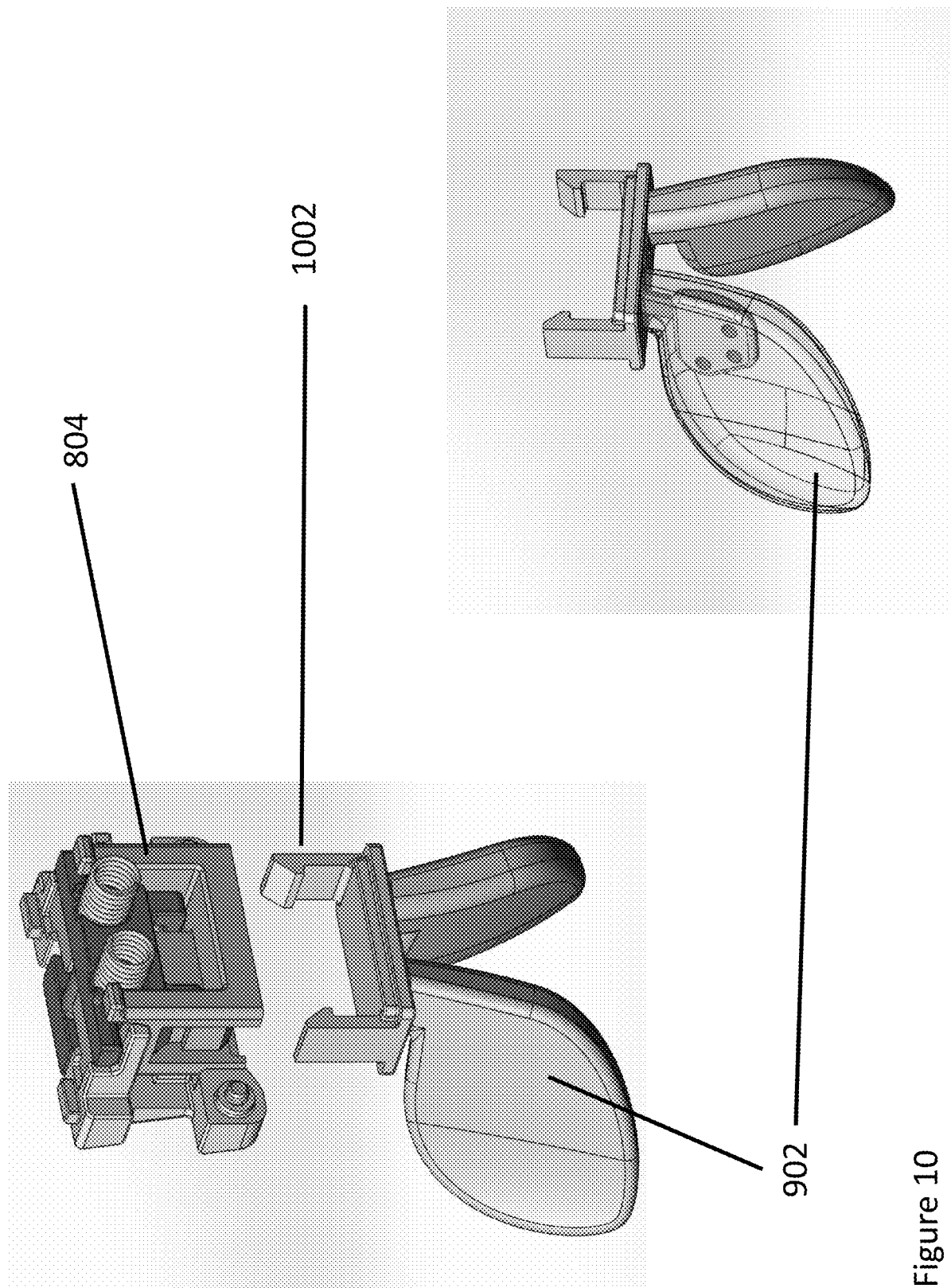

FIG. 10 illustrates an engagement mechanism for removing and replacing the nose pads from and to the vertical adjustment portion of the adjustable nose bridge assembly. As can be seen in FIG. 10, the nose pads are attached to a clip style mechanism that is adapted to mate with the vertical nose bridge adjustment system. FIG. 10 also shows a clear version of one nose pad to illustrate how it is over-molded to a stiff (e.g. metal) member. The inventors appreciate that there are a number of ways to attach the nose pads to the vertical adjustment system and this example is provided as a non-limiting example.

Figure 11:
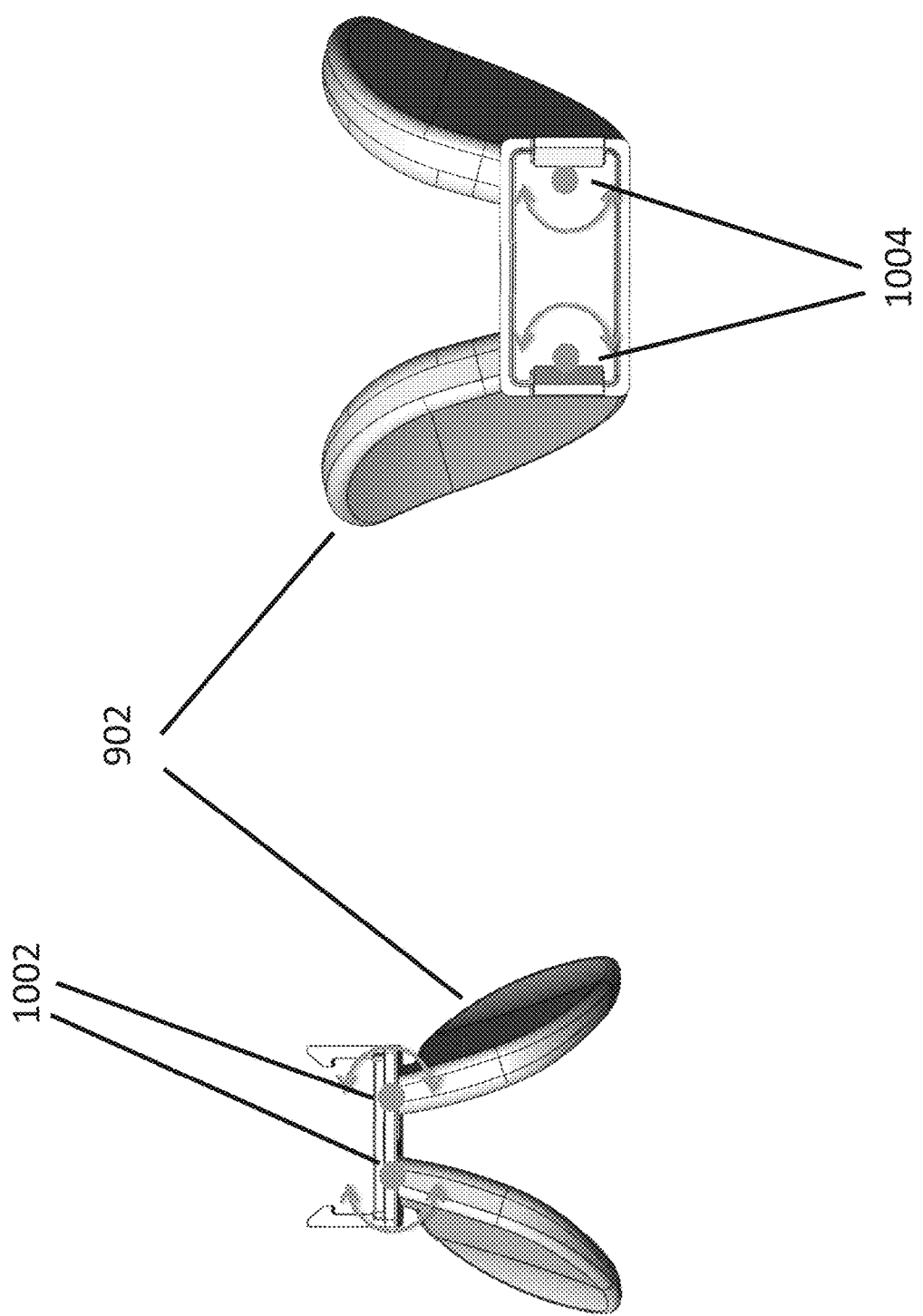
FIG. 11 illustrates a multiple adjustable nose pad assembly in accordance with the principles of the present invention.

FIG. 11 illustrates a system providing two additional movable features for the nose pads. Together with the vertical adjustment portion, this configuration provides for a three-way adjustment system. Adjustment 1002 illustrates how the nose pads may be rotated or otherwise manipulated from a rear facing view. Adjustment 1004 illustrates how the nose pads may be rotated or otherwise manipulated from a top view. Once assembled on the head-worn computer, the vertical adjustment and two nose pad rotational adjustments provide for a system that accommodates many nose, face, and head shapes.

Figure 12:
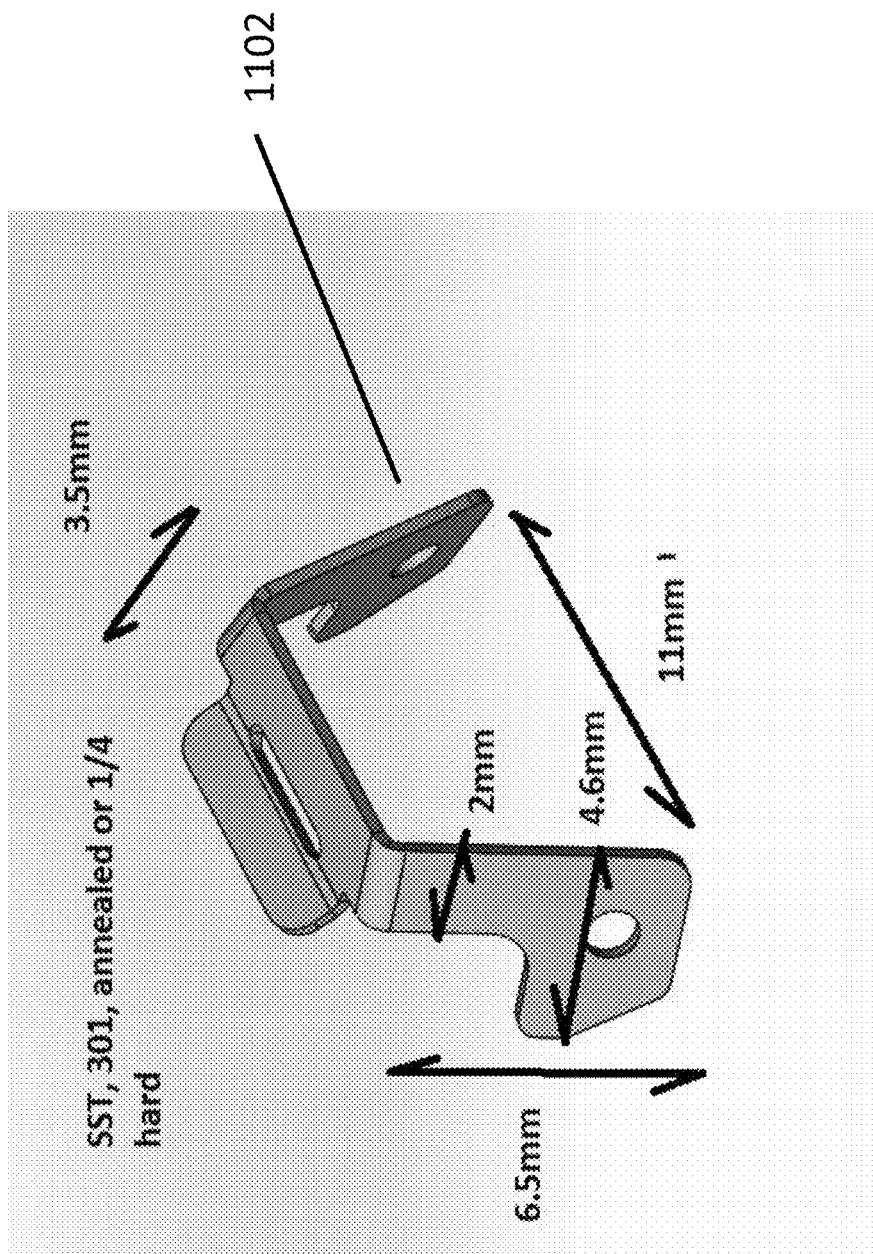
FIG. 12 illustrates a malleable platform use in connection with an adjustable nose bridge assembly in accordance with the principles of the present invention.

FIG. 12 illustrates a nose pad mount 1102. As previously described, the nose pads may be over-molded on to the ends of a mount. In this embodiment, the nose pads are over-molded on the ends of the nose pad mount 1102. The nose pad mount 1102 is designed to be malleable around the 2 mm dimension shown. This permits the user to twist, turn, bend, flare, or otherwise manipulate the nose pad mount 1102 to change the positions of the nose pads, which then can accommodate the user's facial structure. While the embodiment shown in FIG. 12 illustrates a single piece, the inventors have appreciated that this mount may be assembled in multiple pieces.

Although embodiments of HWC have been described in language specific to features, systems, computer processes and/or methods, the appended claims are not necessarily limited to the specific features, systems, computer processes and/or methods described. Rather, the specific features, systems, computer processes and/or and methods are disclosed as non-limited example implementations of HWC. All documents referenced herein are hereby incorporated by reference.

We claim:

1. A wearable head device, comprising:
   a display; and
   a nose bridge assembly coupled to the display, the nose bridge assembly comprising a selection device and a nose pad clip assembly,
   wherein:
   the nose bridge assembly is configured to operate in one of a plurality of states comprising a first state and a second state and is further configured to transition from the first state to the second state, the nose bridge assembly in the first state is configured to provide a first amount of support for the display, the nose bridge assembly in the second state is configured to provide a second amount of support for the display, the second amount of support different than the first amount of support, the selection device is configured to receive input from a user, and in response to the selection device receiving the input while the nose bridge assembly operates in the first state, the nose bridge assembly transitions to the second state, and wherein:

the nose pad clip assembly is configured to be removably mated with the nose bridge assembly without affecting the connection between the nose bridge assembly and the display.

2. The wearable head device of claim 1, wherein the selection device comprises a button and the input comprises a button press.

3. The wearable head device of claim 1, wherein the input comprises an electrical signal.

4. The wearable head device of claim 1, wherein the nose bridge assembly further comprises:

a nose bridge;

a notched member; and a movable pin configured to engage and disengage with the notched member, wherein:

the first state is associated with the movable pin engaged with the notched member, and the second state is associated with the movable pin disengaged with the notched member.

5. The wearable head device of claim 4, wherein:

the nose bridge is configured to move vertically with respect to a nose of a user of the wearable head device while the nose bridge assembly operates in the second state, and the nose bridge is configured to remain stationary with respect to the nose of the user while the nose bridge assembly operates in the first state.

6. The wearable head device of claim 5, wherein the nose bridge moving vertically comprises the nose bridge moving vertically in accordance with an electrical signal.

7. The wearable head device of claim 5, further comprising a nose pad coupled to the nose bridge assembly, wherein:

the nose pad is configured to rotate about two orthogonal axes in response to a second input from the user, and the nose bridge moving vertically comprises the nose pad moving vertically without rotation about the two orthogonal axes.

8. The wearable head device of claim 1, wherein the nose bridge assembly is configured to detach from the wearable head device.

9. The wearable head device of claim 1, wherein the nose pad clip assembly comprises:

a clip portion;

a nose pad mount coupled to a bottom side of the clip, wherein the nose pad mount includes at least a first and second tab; and a first nose pad and second pad, wherein each of the first and second nose pads are configured to be mounted to the first and second tabs, respectively.

* * * * *